US008025255B2

(12) United States Patent
Rouquette et al.

(10) Patent No.: US 8,025,255 B2
(45) Date of Patent: Sep. 27, 2011

(54) AIRCRAFT PILOTING METHOD AND DEVICE FOR PICKING UP A VERTICAL PROFILE OF A FLIGHT PLAN

(75) Inventors: Patrice Rouquette, Pompertuzat (FR); Erwan Cadot, Leguevin (FR); Martin Legay, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 702 days.

(21) Appl. No.: 12/138,389

(22) Filed: Jun. 12, 2008

(65) Prior Publication Data

US 2009/0314896 A1 Dec. 24, 2009

(30) Foreign Application Priority Data

Jun. 13, 2007 (FR) ..................................... 07 04205

(51) Int. Cl.
G05D 1/08 (2006.01)
(52) U.S. Cl. ................ 244/180; 701/18; 701/11; 701/3; 244/181; 244/183; 244/175; 244/76 R
(58) Field of Classification Search ................ 244/76 R, 244/175, 180, 181, 183; 701/3, 11, 18
See application file for complete search history.

(56) References Cited

U.S. PATENT DOCUMENTS

| 5,945,943 | A * | 8/1999 | Kalafus et al. | 342/357.31 |
| 6,870,490 | B2 * | 3/2005 | Sherry et al. | 340/970 |
| 7,216,069 | B2 * | 5/2007 | Hett | 703/6 |
| 2004/0245408 | A1 * | 12/2004 | Peyrucain et al. | 244/183 |
| 2005/0261809 | A1 * | 11/2005 | Artini | 701/3 |
| 2005/0273249 | A1 * | 12/2005 | Artini et al. | 701/120 |
| 2005/0283306 | A1 | 12/2005 | Deker | |
| 2006/0271250 | A1 | 11/2006 | Dubeck | |
| 2008/0172149 | A1 * | 7/2008 | Rouquette et al. | 701/16 |

FOREIGN PATENT DOCUMENTS

| FR | 2 845 170 | 4/2004 |
| FR | 2 870 610 | 11/2005 |
| WO | 03/019115 | 3/2003 |

OTHER PUBLICATIONS

A Cognitive Engineering Analysis of the Vertical Navigation (VNAV) Function, Dec. 1, 2000.*
http://www.igs.net/~kiddbatt/DOCS/unsbs/unsrewrite.html, Universal Avionics Systems Corporation—2001.*
Preliminary Search Report dated Jan. 17, 2008 w/ English translation.
L. Sherry, et al., "A Cognitive Engineering Analysis of the Vertical Navigation (VNAV) Function," Internet Citation, [Online] Dec. 31, 2001, XP002451786, Extrait de l'Internet:URL:http://hsi.arc.nasa.gov/publications/20051025130903_VNAVCogEngJournal 1TM.pdf> [extrait le Sep. 19, 2007] * le document en entier *.

* cited by examiner

*Primary Examiner* — Tien Dinh
*Assistant Examiner* — Justin Benedik
(74) *Attorney, Agent, or Firm* — Dickinson Wright PLLC

(57) ABSTRACT

An aircraft piloting method and device for picking up a vertical profile of a flight plan. The device combines a manual piloting device that enables a pilot to control the start of the picking-up of a vertical profile and an automatic piloting device for automatically ending the vertical profile picking-up and following the vertical profile.

11 Claims, 3 Drawing Sheets

AIRCRAFT PILOTING METHOD AND DEVICE FOR PICKING UP A VERTICAL PROFILE OF A FLIGHT PLAN

FIELD OF THE INVENTION

The present invention relates to a method and a device for piloting an aircraft, particularly a transport airplane, intended to pilot the aircraft so as to enable it to pick up and follow a vertical profile of a flight plan.

BACKGROUND OF THE RELATED ART

It is known that, during a flight, the crew of an aircraft, in particular of a civilian transport airplane, regularly has to fly this aircraft at an altitude that is different from the altitude defined in the flight plan. This generally occurs following an instruction originating from an air traffic controller. The crew must then make the airplane rejoin the flight plan when the controller gives the appropriate authorization, in order to continue the flight and once again follow the vertical profile defined by this flight plan.

Currently, to rejoin (or pick up) such a vertical profile, the crew has several piloting (or vertical guidance) modes. It mainly uses a descent mode, a vertical speed mode or a gradient mode.

The descent mode offers a vertical guidance enabling the crew to follow the vertical profile calculated by a Flight Management System (FMS) and defined in the flight plan. When the crew of the airplane flies at an altitude that is different to that of the vertical profile, it has the option to engage this descent mode which, in this case, completely manages the picking-up and servo-controlling of the airplane to the vertical profile. Once the mode is engaged, the crew is no longer in control of how the airplane rejoins the vertical profile. The crew totally delegates the management of the pick-up process to the automatic pilot and does not have the option to control the path of the airplane.

In the context of the present invention, the expression "picking up a vertical profile" should be understood to mean the process of approaching this vertical profile and arriving at this vertical profile.

Moreover, it is known that predictions relating to the path followed by the airplane, made by the flight management system, are calculated assuming that the crew in this case handles the descent with half of the air brakes extended. However, in reality, it is not uncommon for the crew to be in a different configuration, which the flight management system does not take into account. Consequently, the path predictions of the flight management system often differ from the actual path of the airplane. Thus, it may be that the crew does not have information concerning the path that the airplane will follow or concerning the vertical speed that the aircraft will assume, with such a descent mode.

The vertical speed and gradient modes are piloting (or vertical guidance) modes which enable the crew to choose a vertical pick-up path, by respectively selecting a vertical speed or a gradient which is defined by a climb or descent angle of FPA (Flight Path Angle) type. When one of these two modes is engaged, and when the path selected by the crew passes through an altitude selected on a Flight Control Unit (FCU), the airplane follows the path to this altitude and then levels off. These modes thus make it possible to control the path of the airplane, but they do not make it possible to pick up the vertical profile. In fact, they do not take this vertical profile into account at all.

Consequently, a crew which is located at an altitude that is different from the altitude defined in the flight plan and that wants to control the pick-up path has no solution enabling it to do so easily.

Indeed, as indicated previously, when the aircraft is not flying along the vertical profile, the crew has no direct means for controlling the picking-up of the vertical profile and servo-controlling the aircraft thereto. Since the picking-up of the vertical profile with the above-mentioned descent mode is quite vague to the crew, it often happens that the crew wants to control the picking up of the profile in order to control the point at which the vertical profile is picked up (that is, the moment when the aircraft actually rejoins the vertical profile).

Furthermore, a use of the vertical speed mode to approach the vertical profile and of the descent mode for definitively picking up and servo-controlling to said vertical profile is not a satisfactory solution. In practice, the moment of engagement of the descent mode depends only on the assessment of the crew. Now, a late engagement of this descent mode can possibly affect the safety of the airplane. For example, in the case where an altitude constraint is defined in the flight plan in order to ensure a sufficient distance between the airplane and an obstacle (notably the relief), the failure to comply with the constraint can lead the airplane to approach the obstacle, all the more so since, under the vertical profile, the descent mode makes the airplane join this vertical profile with a high vertical speed, for example of around 1000 feet/minute.

Consequently, the crew of an airplane has no simple and safe means:

for controlling the path for picking up (or rejoining) a vertical profile;

for effectively picking up this vertical profile; and for servo-controlling thereto, in all the cases where the airplane is not located on said vertical profile.

Moreover, document FR-2 870 610 discloses a method and a device for automatically determining a path for picking up a flight path for an aircraft.

SUMMARY OF THE INVENTION

The object of the present invention is to remedy the above-mentioned drawbacks. It relates to a method of piloting an aircraft intended to enable the aircraft to pick up and follow (in a simple way, with enhanced safety and under the control of the crew) a vertical profile of a flight plan, in the case where the aircraft is not located on this vertical profile.

To this end, according to the invention, said piloting method whereby a first piloting mode is used enabling the aircraft to automatically pick up and automatically follow said vertical profile, is noteworthy in that:

A/ in a first phase:
 a) the aircraft is piloted according to a second piloting mode enabling the crew of the aircraft to control the picking-up of said vertical profile;
 b) an engagement zone which depends at least on said vertical profile is determined;
 c) the current position of the aircraft is determined; and
 d) this current position is compared to said engagement zone; and B/ immediately said current position of the aircraft is located in said engagement zone, a second phase is implemented, in which the aircraft is piloted according to said first piloting mode which enables the aircraft to automatically pick up and automatically follow said vertical profile.

Thus, thanks to the invention, two different piloting modes are combined, one (said abovementioned second piloting mode) enabling the crew to control the approach to the vertical profile, for example by selecting a vertical speed or a gradient as specified hereinbelow, and the other (said abovementioned first piloting mode) automatically ending the pick-up phase, immediately the aircraft is located in said engagement zone, that is, close to said vertical profile. Furthermore, the latter piloting mode automatically follows the picked-up vertical profile.

Consequently, thanks to the invention:
during the first phase (in which the second piloting mode is applied), the crew is able to control the picking-up of the vertical profile, which makes it possible in particular to avoid the abovementioned drawbacks associated with the use of a descent mode (which does not allow the crew any control) in this first phase;
the second phase (in which said first automatic piloting mode is applied) is engaged automatically immediately the aircraft is located in said engagement zone which is defined around the vertical profile, as specified hereinbelow. Thus, the moment of engagement of this first piloting mode does not depend on the assessment of the crew, which makes it possible in particular to avoid too late an engagement of said first piloting mode; and
the definitive picking-up and following of the vertical profile are handled automatically, which reduces the workload of the crew. Furthermore, these maneuvers that are performed automatically are implemented very precisely.

In the context of the present invention, the expression "picking up a vertical profile", should be understood to mean the maneuver consisting in making the aircraft rejoin the vertical profile until the latter is reached.

In a particular embodiment, in the step A/b), the current vertical speed of the aircraft is determined, and said engagement zone is determined relative to an engagement limit zone which depends on said current vertical speed and on its convergence with said vertical profile.

Furthermore, advantageously, in the vertical profile pick-up phase:
the point of intersection between the current path for picking up the vertical profile, followed by the aircraft, and said vertical profile is determined; and
this point of intersection is presented to the crew of the aircraft.

Conversely, if the current pick-up path does not converge toward said vertical profile, that is, if said point of intersection does not exist and cannot therefore be calculated, the crew of the aircraft is notified.

In a first preferred embodiment, said first and second piloting modes are different piloting modes, and said first piloting mode is automatically armed when the crew engages said second piloting mode in the step A/a) in order to control the picking-up of the vertical profile. This duly armed first piloting mode is then engaged automatically, immediately the current position of the aircraft is located in the engagement zone.

Furthermore, in a second embodiment, said second piloting mode represents a modified version of said first piloting mode, for example a descent mode, enabling the crew to control the picking-up of the vertical profile.

Furthermore, advantageously, said first piloting mode is one of the following modes:
a descent mode, according to which the aircraft is piloted automatically in descent mode to pick up the vertical profile, then to follow it;
a climb mode, according to which the aircraft is piloted automatically in climb mode to pick up the vertical profile, then to follow it.

Furthermore, advantageously, said second piloting mode is one of the following modes:
a vertical speed mode, enabling the crew to manually control the vertical speed that is applied to the aircraft;
a gradient mode, enabling the crew to manually control the gradient that is applied to the aircraft.

The present invention also relates to a device for piloting an aircraft, for example a transport airplane, which is intended to pilot the aircraft so that it picks up and follows a vertical profile of a flight plan.

To this end, according to the invention, said device of the type comprising a first piloting means applying a first piloting mode enabling the aircraft to automatically pick up and automatically follow said vertical profile,
is noteworthy in that it also comprises:
a second piloting means applying a second piloting mode which enables the crew of the aircraft to control the picking-up of said vertical profile;
first means for determining an engagement zone which depends at least on said vertical profile;
second means for determining the current position of the aircraft;
third means for comparing this current position to said engagement zone; and
switching means which are linked to said first and second piloting means and which are controlled by said third means so as to apply to said aircraft:
said second piloting mode applied by said second piloting means in an initial first phase; and
said first piloting mode applied by said first piloting means in a subsequent second phase (following said first phase), which begins immediately said current position of the aircraft is located in said engagement zone.

BRIEF DESCRIPTION OF THE DRAWINGS

The figures of the appended drawing will better show how the invention can be represented. In these figures, identical references denote similar elements.

DETAILED DESCRIPTION OF THE INVENTION

Figure 1:
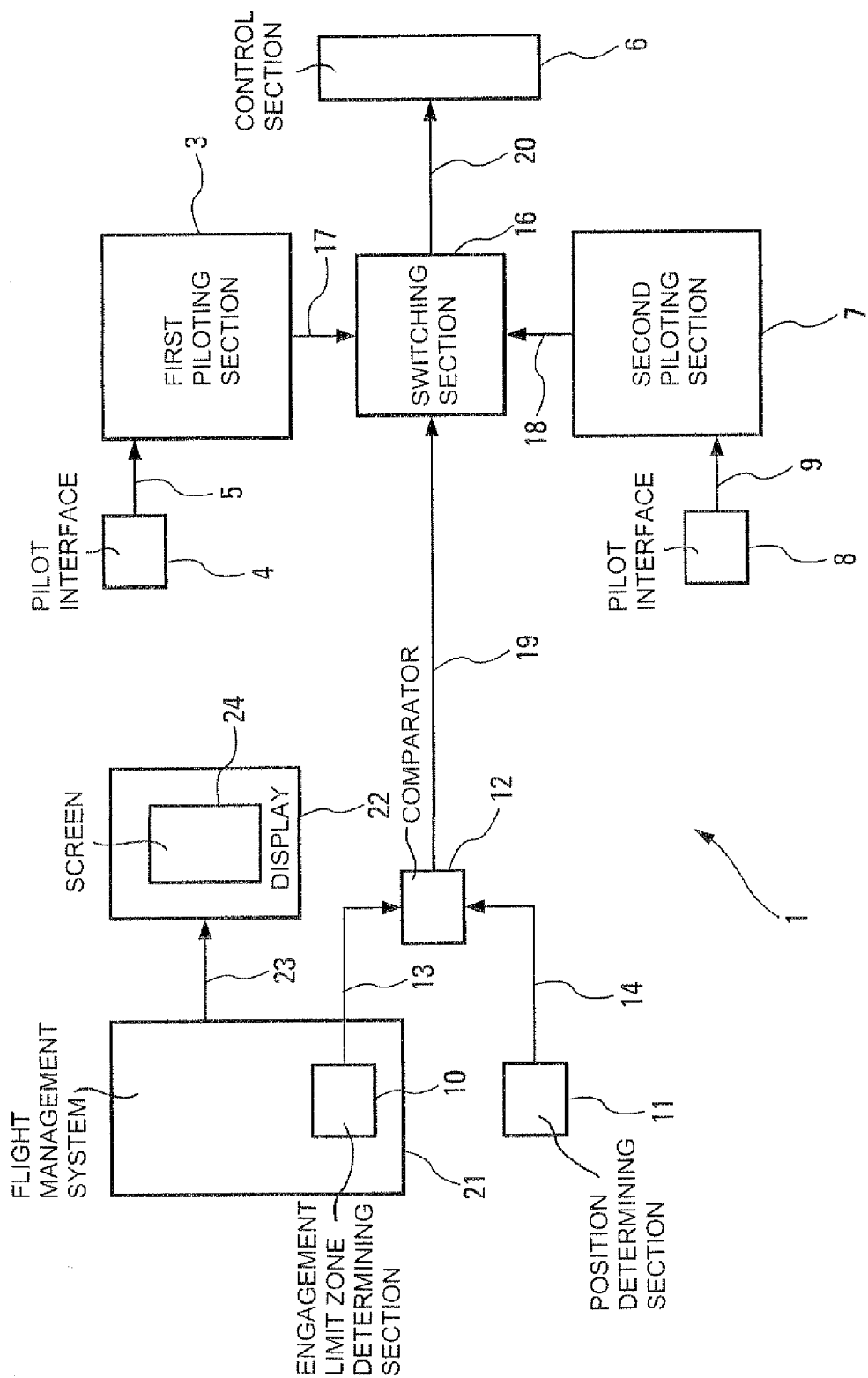
FIG. 1 is the block diagram of a piloting device according to the invention.

The device 1 according to the invention and diagrammatically represented according to a first particular embodiment in FIG. 1, is intended to pilot an aircraft A, in particular a transport airplane, so as to enable it to pick up and follow a vertical profile PV (represented in FIG. 2) of a flight plan, in the case where said aircraft A is not located on this vertical profile PV.

It is known that, during a flight, the crew of an aircraft A, for example of a civilian transport airplane, is regularly made to fly this aircraft A at an altitude that is different from the altitude defined in the flight plan. This generally occurs following an instruction originating from an air traffic controller. The crew must then make the aircraft A rejoin the flight plan when the controller gives authorization for it, in order to continue the flight and once again follow the vertical profile PV defined by this flight plan.

Figure 2:
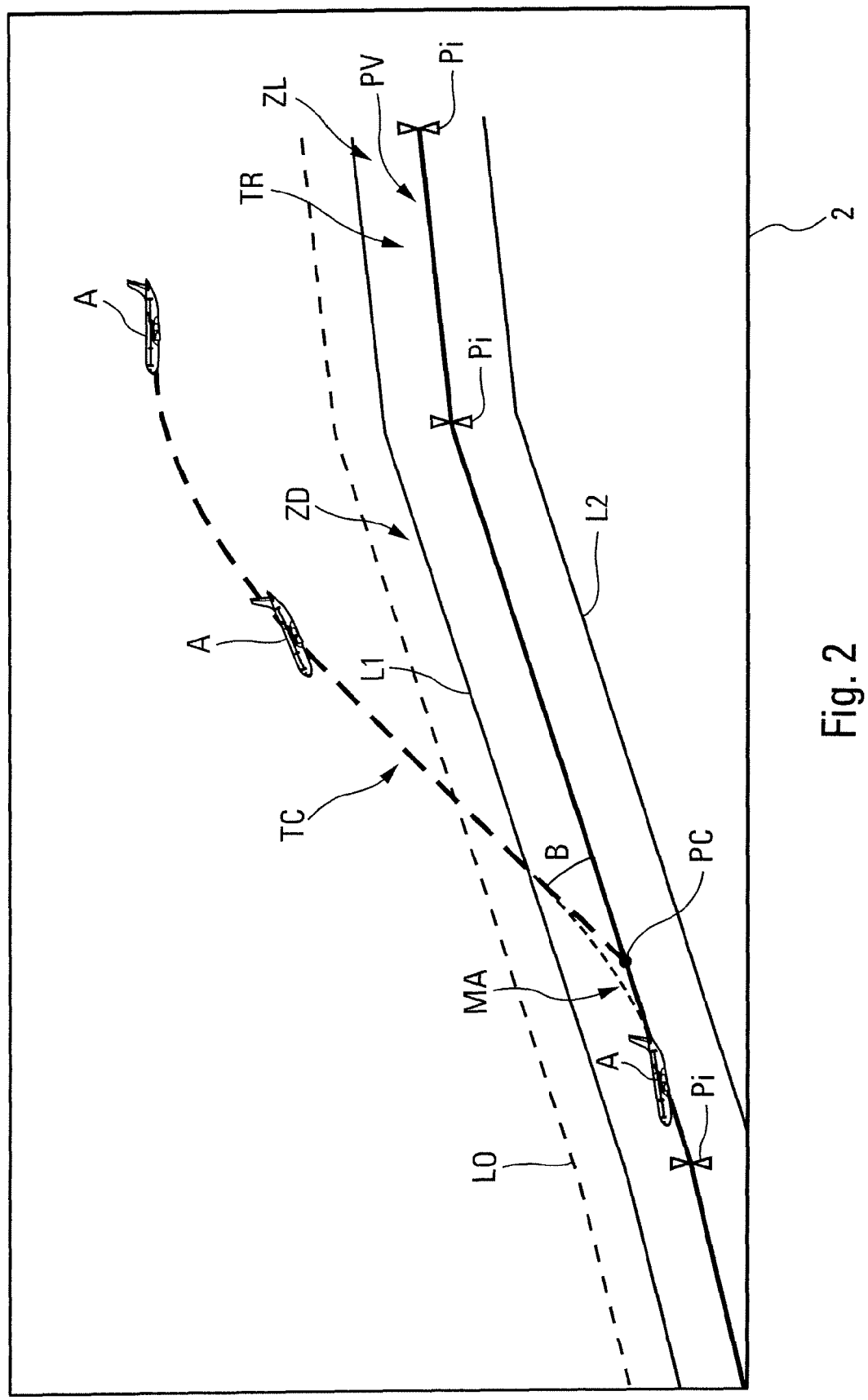
FIG. 2 illustrates a vertical plan, in which the picking-up of a vertical profile, applied using a piloting device according to the invention, is represented.

Usually, a flight plan defines a flight path (or reference path) TR in space, which must be followed by the aircraft A, which is configured along a plurality of waypoints. This reference path TR comprises a lateral path which is defined in the horizontal plane and a vertical path (or vertical profile PV) which is defined in the vertical plane 2, and which preferably comprises rectilinear segments separated by points Pi, as represented in FIG. 2.

Said device 1 is of the type comprising a piloting means 3 of the usual type, which can be engaged manually by a pilot, via an operating means 4 which is linked by a link 5 to said piloting means 3. This piloting means 3 automatically determines guidance instructions for the aircraft A which make it possible to automatically pick up and automatically follow a vertical profile PV. These guidance instructions are usually transmitted to a set 6 of control means of the aircraft, namely usual operating means for controlled units (such as control surfaces, engines, and so on) of the aircraft A.

According to the invention, the piloting mode (hereinafter called "first piloting mode") which is applied by said piloting means 3 can be one of the following modes:
  a descent mode (or DES mode), for which the piloting means 3 automatically pilots the aircraft A in descent mode to first of all pick up the vertical profile PV, then to follow it (after picking it up); or
  a climb mode (or CLB mode), for which the piloting means 3 automatically pilots the aircraft A in climb mode to first of all pick up the vertical profile PV, then to follow it (after picking it up).

According to the invention, said device 1 comprises, in addition to said piloting means 3:
  means 10 which are, for example, part of a Flight Management System (FMS) and which determine an engagement zone ZD which depends at least on said vertical profile PV, as specified hereinbelow;
  usual means 11 which can determine the current position of the aircraft A;
  means 12 which are respectively linked via links 13 and 14 to said means 10 and 11 and which are intended to compare the current position of the aircraft A received from said means 11 to the engagement zone ZD determined by said means 10;
  a piloting means 7 which applies a second piloting mode intended to determine guidance instructions which are transmitted to said set 6. This piloting means 7 enables the crew, in particular the pilot of the aircraft A, to control the picking-up of the vertical profile PV, for example by the possibility to select a vertical speed or a gradient, via the usual operating means 8 which is linked via a link 9 to said piloting means 7; and
  switching means 16 which are linked via links 17, 18, 19 and 20 respectively to said piloting means 3, to said piloting means 7, to said means 12 and to said set 6.

According to the invention, said switching means 16 apply to said set 6 the instructions generated by one or other of said piloting means 3 and 7, notably according to information received from said means 12. More specifically, said switching means 16 apply to said set 6:
  the second piloting mode applied by said piloting means 7, in a first phase of the picking-up and following maneuver; and
  the first piloting mode applied by said piloting means 3, in a second phase of this maneuver (which directly follows said first phase). This second phase begins immediately the current position of the aircraft A is located in the engagement zone ZD (information received from the means 12).

Thus, the device 1 according to the invention combines two different piloting modes 3 and 7, one (said piloting means 7) enabling the crew to control the approach to the vertical profile PV, for example by selecting a vertical speed or a gradient as specified hereinbelow, and the other (said piloting means 3) automatically ending the pick-up phase, immediately the aircraft A is located in said engagement zone ZD, that is immediately it is close to said vertical profile PV. Moreover, this piloting means 3 also automatically follows the picked-up vertical profile PV.

Consequently, thanks to the invention:
  during the first phase (in which the piloting means 7 is active), the crew is able to control the picking-up of the vertical profile PV;
  the second phase (during which the automatic piloting means 3 is active) is engaged automatically immediately the aircraft A is located in said engagement zone ZD which is defined relative to the vertical profile PV, as specified hereinbelow. Thus, the moment of engagement of this piloting means 3 does not depend on the assessment of the crew, which makes it possible in particular to avoid engaging the latter too late; and
  the definitive picking-up and following of the vertical profile PV are handled automatically, which reduces the workload of the crew. Moreover, these maneuvers applied using the automatic piloting means 3 are performed very accurately.

In a preferred embodiment, said means 10 determine said engagement zone ZD as adjacent to an engagement limit zone ZL, on the side (above or below) from which the aircraft A arrives at the vertical profile PV. This engagement limit zone ZL is determined in the form of a cylinder, the top and bottom parts of which (in the vertical plane 2) are represented by lines L1 and L2 in FIG. 2. This engagement limit zone ZL is defined about the reference path TR and therefore surrounds said vertical profile PV. The size of this engagement limit zone ZL is optimized and depends mainly on the vertical speed of the aircraft A and its convergence with the vertical profile PV. In FIG. 2, the engagement zone ZD is delimited by a line L0 and said line L1.

To be able to rejoin the vertical profile PV without overshooting it, the aircraft A must be able to carry out a leveling-off maneuver MA between the pick-up path TC and the vertical profile PV. To perform this leveling off in correction conditions, it must begin this maneuver early enough before arriving at the vertical profile PV. This is why said engagement limit zone ZL must be taken into account, within which it is not possible to pick up the vertical profile PV without overshooting it. It will be noted that the distance H between the limit L1 of the engagement limit zone ZL and the vertical profile PV when the aircraft A is above the vertical profile PV (or between L2 and PV when the aircraft A is below it) must be correspondingly greater when the vertical speed Vz of the aircraft A is high, so that the latter can fly the leveling-off path MA in correct conditions. Moreover, this distance H must be correspondingly greater when the angle B between the path TC and the vertical profile PV (that is, a gradient difference) is great. Indeed, the higher the vertical speed of the aircraft A, the greater the distance needed to perform a leveling-off in correct conditions. Similarly, the greater the angle B, the greater the distance needed to perform the leveling-off. Correct conditions for performing the leveling-off should be understood to mean:

the maneuverability capabilities of the aircraft A to fly the leveling-off path MA; and a limit vertical load factor for the comfort of the passengers (for example 1.5 g).

The engagement zone ZD, inside which said first piloting mode is engaged, that is, the vertical distance between L0 and L1 in FIG. 2, corresponds to a predetermined value which is preferably between 50 and 100 feet.

Said engagement zone ZL is calculated in real time to take account of the variations of the values of the vertical speed Vz and of the angle B. In practice, when the crew selects a vertical speed set point Vz, the value of the angle B can vary (primarily as a function of the wind). Similarly, when it selects a gradient set point (FPA mode), the vertical speed Vz can vary (primarily as a function of the wind).

During the first phase, the crew can, in a particular embodiment specified hereinbelow, vary the vertical speed of the aircraft A as it wishes. In such a case, immediately a new vertical speed value is selected by the crew, the means 10 determine a new engagement limit zone ZL (and a new engagement zone ZD). These means 10 can be part of a usual Flight Management System (FMS) 21. This flight management system 21 also determines the point of intersection PC between the pick-up path TC followed by the aircraft A and the vertical profile PV, as represented in FIG. 2, as well as the moment when the aircraft A, several positions of which are represented along the path TC in FIG. 2, reaches the vertical profile PV.

The device 1 can also comprise display means 22 which are, for example, linked via a link 23 to said flight management system 21 and which represent this point of intersection PC on at least one display screen 24, for example a navigation screen of the Navigation Display (ND) type or a Vertical Display (VD) type means.

If the path TC of the aircraft A does not converge toward the vertical profile PV, the device 1 notifies the crew by a message which is displayed on a screen, preferably on the display screen 24, in particular in the primary field of vision of the pilot, of the absence of a point of intersection PC.

In the first embodiment represented in FIG. 1, said piloting means 3 and 7 are different piloting means. In particular, said piloting means 7 can apply one of the following piloting modes:

a vertical speed mode (or V/S mode), which enables the crew to manually control and select, in a usual way, using the means 8, the vertical speed which is applied to the aircraft A (via the set 6); or a gradient mode (or FPA mode), which enables the crew to manually control and select (using the means 8) the gradient that is applied to the aircraft A (via the set 6). This gradient is defined by a climb or descent angle of FPA (Flight Path Angle) type.

Moreover, in this first embodiment, the (first) piloting mode, for example a descent mode, which is applied by the piloting means 3 is automatically armed when the crew engages (via the means 8) the (second) piloting mode, for example a vertical speed mode, which is applied by the piloting means 7. The duly armed piloting means 3 is then automatically engaged immediately the aircraft A penetrates into the engagement zone ZD.

Figure 3:
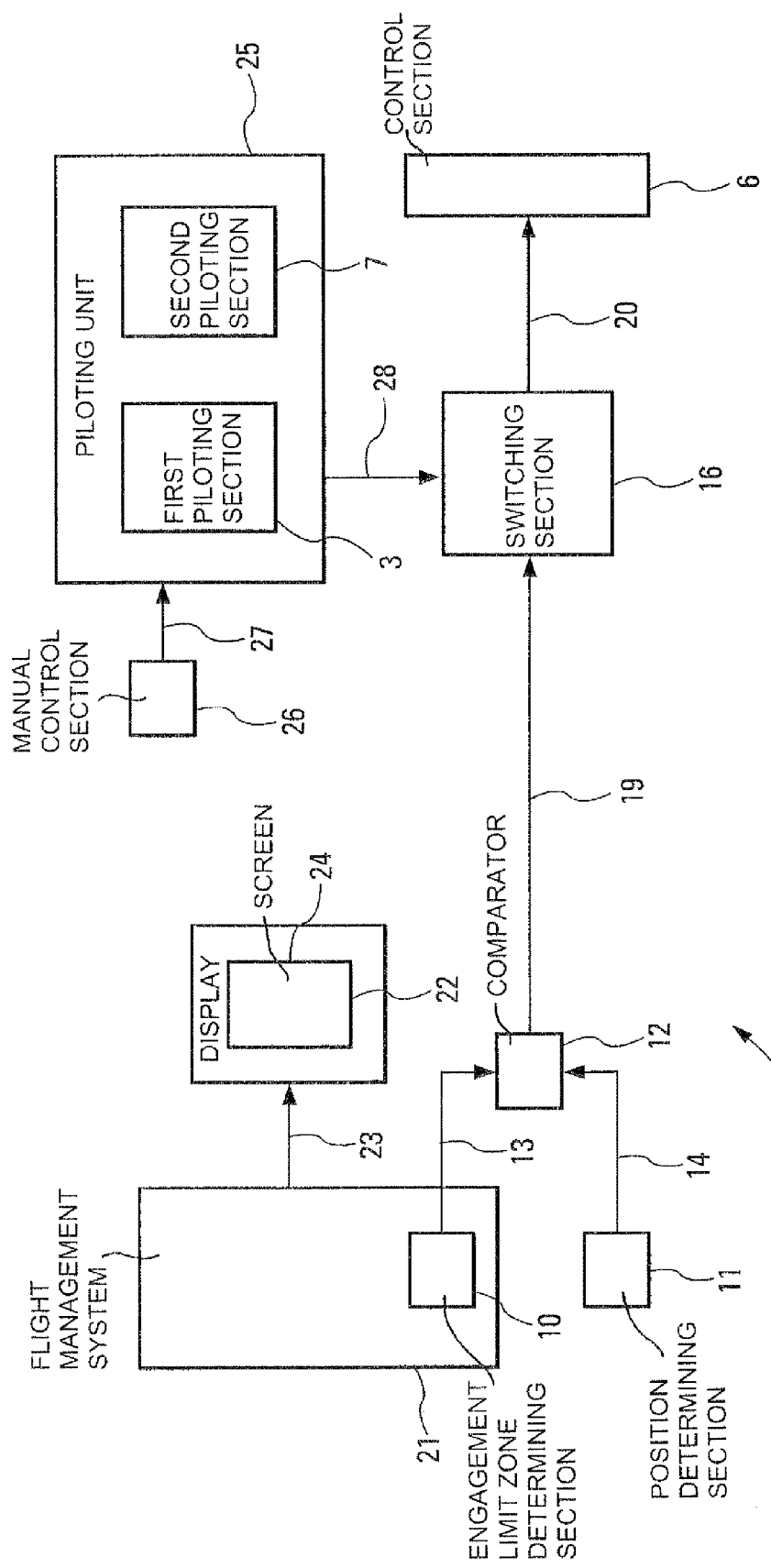
FIG. 3 is a block diagram of a particular embodiment of a piloting device according to the invention.

Moreover, in a second embodiment represented in FIG. 3, said piloting means 3 and 7 are part of one and the same piloting unit 25:

which relates to a descent mode or to a climb mode;

which can be manually controlled via means 26 which are linked to said piloting unit 25 by a link 27; and which is linked by a link 28 to the switching means 16.

In this case, the piloting mode applied by the piloting means 7 represents a modified version of the piloting mode (descent mode or climb mode) applied by the piloting means 3. This modification relating to the behavior and to the logics of the descent mode or the climb mode is formed in such a way as to enable the crew to control the picking-up of the vertical profile PV. In this case, the aircraft A can rejoin the vertical profile PV either independently, or by following an instruction given by the crew. However, immediately the aircraft A is located in the engagement zone ZD, the device 1 resumes control and uses the piloting means 3 to pick up the vertical profile PV to be servo-controlled thereto.

The invention claimed is:

1. A method of piloting an aircraft to enable the aircraft to pick up and follow a vertical profile of a flight plan, whereby a first piloting mode is used enabling the aircraft to automatically pick up and automatically follow said vertical profile, and a second piloting mode is used enabling the crew of the aircraft to control the picking-up of said vertical profile, the method comprising:

A/ in a first phase:
  a) piloting the aircraft according to said second piloting mode enabling the crew of the aircraft to control the picking-up of said vertical profile;
  b) determining automatically in real time an engagement zone which is adjacent, by a predetermined value, to an engagement limit zone on the side from which the aircraft arrives at the vertical profile, said engagement limit zone being calculated in real time according to the vertical speed of the aircraft and an angle between a pick-up path and the vertical profile;
  c) determining automatically the current position of the aircraft; and
  d) automatically comparing this current position to said engagement zone; and B/ automatically initiating a second phase immediately after said current position of the aircraft is located in said engagement zone, in which the aircraft is piloted according to said first piloting mode which enables the aircraft to automatically pick up and automatically follow said vertical profile, wherein:

within the engagement limit zone, the vertical profile cannot be picked up without overshooting it, the engagement limit zone is defined about a reference path and surrounds the vertical profile, and the vertical distance between the upper boundary of the engagement zone and the upper boundary of the engagement limit zone corresponds to a predetermined value.

2. The method as claimed in claim 1, wherein, in the step A/b), said engagement limit zone is determined in the form of a cylinder.

3. The method as claimed in claim 1, wherein, in the vertical profile pick-up phase:

the point of intersection between the current path for picking up the vertical profile, followed by the aircraft, and said vertical profile is determined; and this point of intersection is presented to the crew of the aircraft.

4. The method as claimed in claim 3, wherein, if said point of intersection does not exist, the crew of the aircraft is notified.

5. The method as claimed in claim 1, wherein:

said first and second piloting modes are different piloting modes, said first piloting mode is automatically armed when the crew engages said second piloting mode in the step A/a) in order to control the picking-up of the vertical profile, and said duly armed first piloting mode is engaged automatically immediately after the current position of the aircraft is located in the engagement zone.

6. The method as claimed in claim 1, wherein said second piloting mode represents a modified version of said first piloting mode, enabling the crew to control the picking-up of the vertical profile.

7. The method as claimed in claim 1, wherein said first piloting mode is one of the following modes:
   a descent mode, according to which the aircraft is piloted automatically in descent to pick up the vertical profile, then to follow it;
   a climb mode, according to which the aircraft is piloted automatically in climbing to pick up the vertical profile, then to follow it.

8. The method as claimed in claim 1, wherein said second piloting mode is one of the following modes:
   a vertical speed mode, enabling the crew to manually control the vertical speed that is applied to the aircraft;
   a gradient mode, enabling the crew to manually control the gradient that is applied to the aircraft.

9. A device for piloting an aircraft, which is intended to pilot the aircraft so that it picks up and follows a vertical profile of a flight plan, said device comprising:
   a first piloting section that applies a first piloting mode enabling the aircraft to automatically pick up and automatically follow said vertical profile;
   a second piloting section that applies a second piloting mode which enables the crew of the aircraft to control the picking-up of said vertical profile;
   a first determining section that determines an engagement zone;
   a second determining section that determines the current position of the aircraft; and
   a comparator that compares this current position to said engagement zone, wherein:
   said first determining section automatically determines, in real time, said engagement zone which is adjacent, by a predetermined value, to an engagement limit zone on the side from which the aircraft arrives at the vertical profile, said engagement limit zone being calculated in real time according to the vertical speed of the aircraft and an angle between a pick-up path and the vertical profile; and
   said device also comprises a switch that is linked to said first and second piloting sections and which is automatically controlled by said comparator so as to automatically apply to said aircraft:
   said second piloting mode applied by said second piloting section in an initial first phase; and
   said first piloting mode applied by said first piloting section in a second phase, which begins automatically immediately after said current position of the aircraft is located in said engagement zone, wherein:
   within the engagement limit zone, the vertical profile cannot be picked up without overshooting it,
   the engagement limit zone is defined about a reference path and surrounds the vertical profile, and
   the vertical distance between the upper boundary of the engagement zone and the upper boundary of the engagement limit zone corresponds to a predetermined value.

10. An aircraft, which comprises a device such as that specified under claim 9.

11. The method of claim 1, wherein the engagement zone is calculated to account for variations of the vertical speed and an angle between the pick-up path and the vertical profile.

* * * * *